Sept. 27, 1966  W. EIDUS  3,274,995
THERMOELECTRIC DENTAL PROBE
Filed July 9, 1963
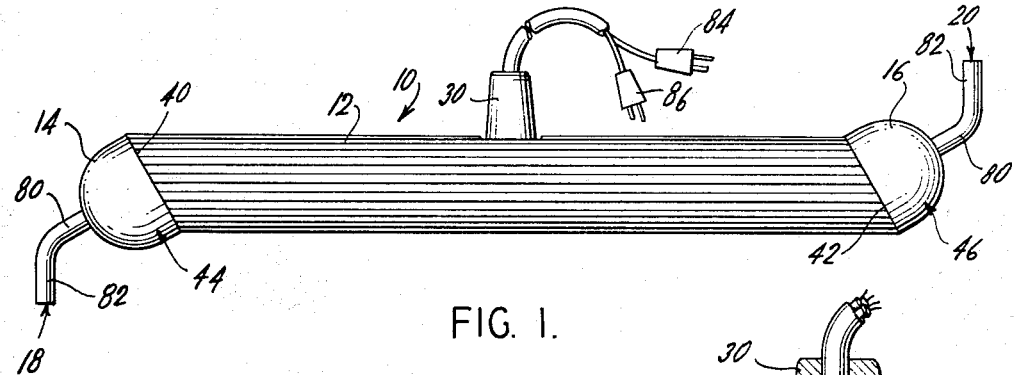
FIG. 1.
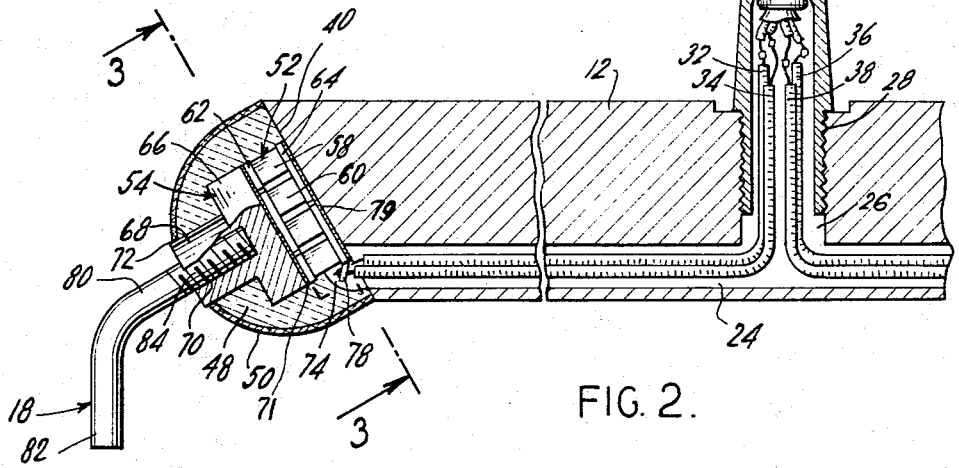
FIG. 2.
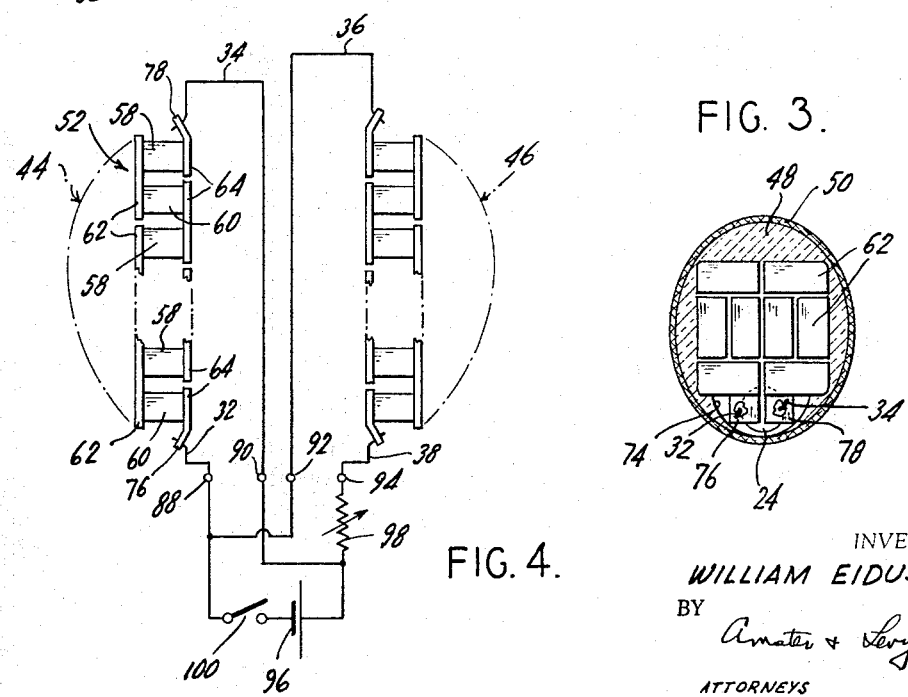
FIG. 3.
FIG. 4.
INVENTOR.
WILLIAM EIDUS
BY Amater & Levy
ATTORNEYS 3,274,995
THERMOELECTRIC DENTAL PROBE
William Eidus, 1 Bonnie Court, Spring Valley, N.Y.
Filed July 9, 1963, Ser. No. 293,679
5 Claims. (Cl. 128—2)

The present invention relates to improvements in dental apparatus, and in particular to a novel and improved dental probe for pulp testing.

In dental pulp testing to determine the sensitivity of a tooth, it is the customary procedure to apply heat and cold alternately to the affected tooth and thereby determine whether the patient can feel both the hot and cold applications and whether it causes him pain. The present practice is to apply heat by an electrically-heated probe and to cool the tooth by applying ice or ethyl chloride directly to the tooth.

One difficulty with the present practice of pulp testing is that the methods of applying the heating and cooling applications are inconvenient, and often ineffective. It is often required that the heating and cooling applications be applied in rapid succession, which is impossible where ice or ethyl chloride is employed to produce the cooling. Further, it is often essential that individual teeth be tested one at a time in order to isolate the particular tooth to be treated or repaired. This is important in determining whether root canal work, ordinary filling or tooth removal is necessary, and such isolation is particularly inexact where the affected tooth is located among a series of teeth covered by a crown. The isolation of a particular tooth is difficult, if not impossible, where ice or ethyl chloride must be applied over a relatively wide area.

A further problem arises where the degree of pulp sensitivity must be determined, there being no means to control the cooling effect produced by the ice or ethyl chloride which is applied directly to the teeth.

It is an object of the present invention to provide a compact and lightweight probe which is particularly intended as a dental pulp tester, but which may also be used in dermatology and neurology for testing the extent of sensitivity in nerve tissue and for hypothermia purposes, the probe being capable of producing both heating and cooling for spot application.

Another object of the invention is the provision of a probe of the character described which contains thermocouple means utilizing the Peltier effect to produce selective heating and cooling within the body of the probe itself, and means for applying such heating and cooling to a localized spot or area.

Still another object of the invention is the provision of a probe of the character described in which both the heating and cooling produced may be selectively adjusted in intensity for testing the degree of nerve sensitivity.

A further object of the invention is to provide a probe of the character described which, in one preferred form, has a thermocouple unit at each end thereof for simultaneously providing both heating and cooling depending upon which end is employed, and in which the probe member is thermally conductive so as to serve as a heat sink for one thermocouple unit and a cold sink for the other unit.

Additional objects and advantages of the invention will become apparent during the course of the following specification when taken in connection with the accompanying drawings, in which:

FIG. 1 is a side elevational view of a probe made in accordance with the invention;

FIG. 2 is an enlarged central longitudinal section through the probe shown in FIG. 1, with portions thereof broken away;

FIG. 3 is a section taken along line 3—3 of FIG. 2;

FIG. 4 is a schematic view of the electrical circuit employed in the probe of FIGS. 1–3.

Referring in detail to the drawings, there is shown a probe 10 comprising an elongated probe member 12 having at each end a head member 14 and 16, said head members mounting respective tips 18 and 20.

The probe member 12 is made of a metal of good thermal conductivity, such as aluminum, and is preferably cylindrical and provided with a circumferential row of ribs 22 on its outer surface to provide a knurled surface for manual gripping of the probe, as well as providing a heat-dissipating surface. The probe member 12 also has a through longitudinal bore 24 offset from the central axis thereof and communicating with a bore 26 which extends radially through the center of probe member 12. The bores 24 and 26 serve as conduits for the electrical wiring of the assembly, as will be presently described.

The bore 26 communicates with the exterior of the probe member 12 and is provided with internal threading 28 for the mounting of an externally-threaded insulating cap 30. This cap 30 provides a support for electrical lead wires 32, 34, 36 and 38 which are connected to the thermocouple members in a manner to be presently described.

The ends of the probe member 12 are cut angularly to provide end surfaces 40 and 42 oppositely inclined at angles of approximately 45° to the axis of probe member 12. To these end surfaces 40 and 42 are connected respective thermocouple housings 44 and 46. The housings 44 and 46 are made of polyurethane foam 48 covered by a ceramic cap 50. Embedded within the foam body 48 of each housing 44 and 46 is a thermocouple module 52 and a socket 54 for mounting a probe tip 18 or 20.

Each thermocouple module 52 comprises a suitable number (herein shown as eight) of individual thermocouple units connected in series.

Specifically, each thermocouple module 52 is composed of a series of semiconductor elements 58 of the p-type, alternating with semiconductor elements 60 of the n-type. Both elements 58 and 60 are preferably made in the form of rods of barium telluride; the p-type differing from the n-type in physical properties of the semiconductor employed. Barium telluride thermocouples of this type are well known and are commercially available.

Each individual pair of semiconductor elements 58 and 60 is connected at its outer ends by thin plates 62 of electrically-conductive metal such as copper, while adjacent pairs of elements 58 and 60 are connected at their inner ends by similar copper plates 64. The plates 62 and 64 are thus arranged to connect the elements 58 and 60 in series, as best shown in FIG. 4. When electrical current is passed through the thermocouple series in one direction, the outer plates 62 will serve as cold junctions and the inner plates 64 as hot junctions. If the direction of the electrical current is then reversed, the inner plates 64 will become the hot junctions and the outer plates 62 the cold junctions.

The thermocouple modules are embedded in the filler 48 of polyurethane foam which acts as heat insulating means to prevent the heat generated at the hot junctions from overtaking the cold prevailing at the cold junctions. The outer surfaces of the junction plates 62 and 64 are, however, exposed at the respective top and bottom edges of the foam filler 48, as shown in FIGS. 2 and 3, in order to be intimately associated with the metal pieces to which the thermocouple module is attached.

The socket 54 is made of heat-conductive metal having a flat base 66 which preferably conforms in size and shape to the thermocouple module 52. Integral with the base 66 is a cylindrical socket portion 68 having a threaded central longitudinal bore 70.

In assembling each of the housing 44 and 46, the socket base 66 is secured flat against the outer surface of the thermocouple module 52, as by a thin layer 71 of epoxy resin which also serves to electrically insulate the outer thermocouple plates 62 from the metallic base 66. The base 66 and attached thermocouple module 52 are then placed within the ceramic cap 50 in the position shown in FIG. 2. In this position, the outer edge of the socket portion 68 extends through a central aperture 72 of the cap 50 and is flush with the outer surface of said cap 50. The inner surface of the thermocouple module 52 is also aligned with the bottom edge surface of the cap 50. The polyurethane foam 48 is then poured within the cap 50, filling the spaces between the semiconductor elements 58 and 60, and in effect encapsulating the module 52 and socket 54. The foam is then allowed to harden so that it forms the body of the housing 44, 46, and securely mounts the themocouple module 52 and socket 54 within the cap 50. Before the foam has hardened, a recess 74 is formed in the foam body, as shown in FIGS. 2 and 3, to provide space for the themocouple terminals and their connections.

After the housings 44 and 46 have been formed as described above, the electrical leads 32, 34, 36 and 38 are connected to the thermocouple modules 52. For this purpose, each module 52 has a pair of terminal lugs 76 and 78 connected to or integral with the respective junction plates 64 at the ends of the series. These terminal lugs 76 and 78 are located in the head recess 74. The bare ends of leads 32 and 34 are soldered to their respective terminals 76 and 78, as shown in FIG. 2. In similar manner, the leads 36 and 38 are soldered to the respective terminals of the module in the opposite housing 46.

The tips 18 and 20 are of identical construction and each comprises a cylindrical rod of heat-conductive metal such as silver or silver-coated copper, which may be readily sterilized. Each tip is bent centrally to provide a mounting section 80 and a probe section 82 arranged at an angle of 45° to each other. The end of mounting section 80 is provided with external threading 84 whereby the tip may be immovably mounted within the threaded bore 70 of socket 54, but may be removed for sterilization or replacement.

Each pair of wires 32, 34 and 36, 38 is connected to a respective plug 84 and 86 which is polarized for connection into individual terminal sockets of a power source for energization with opposite polarity. It is well known that when direct current is fed to thermocouple modules of the type shown herein, a Peltier effect is produced, causing one side of the semiconductor elements to produce refrigeration, and the other sides thereof to produce heat. Thus one set of junction plates, for example, the outer plates 62 will become the "cold side" of the module and the inner plates 64 will become the "hot side." If the polarity of the direct current is reversed, the outer plates 62 will become the "hot side" and the inner plates 64 the "cold side." As shown in FIG. 4, the socket terminals 88, 90 and 92, 94 of the power source 96 are so arranged that a current of such polarity is fed to the module 52 of head 44 that the outer plates 62 will be cooled and the inner plates 64 will be heated. At the same time, a current of reverse polarity is fed to the module of head 46, causing these outer plates 62 to be heated and the inner plates 64 cooled.

Since the outer plates 62 of each module 52 are in heat-exchange relationship with a socket 54 and the tip 18 mounted thereon, it will be appreciated that the cooling effect produced at the outer module plates 62 of housing 44 will be distributed through socket 54 to tip 18. At the same time, the heating effect produced at the outer module plates of the opposite housing 46 will be transmitted to its tip 20. Thus, one tip 18 will be cold and the other tip 20 hot. This permits the operator to apply both heat and cold successively to the area being treated, by merely reversing the instrument in his hand.

It will be appreciated that since the outer junction plates 62 of each module 52 produce the heating or cooling effect utilized, and are therefore the operative side of the module, the other side incorporating the inner plates 64 will produce the opposite thermal effect which must be dissipated to prevent exchange of heat with the operative side. For example, the inner plates 64 of the housing 44 will be the hot side of the module, while the inner plates 64 of the housing 46 will be the cold side thereof. The probe member 12, being made of heat-conductive metal will act both as a heat sink for housing 44 and as a cold sink for housing 46. The heat generated at the inner plate side of housing 44 will be transmitted through the probe member 12 toward the center thereof, and the cold generated at the inner plate side of housing 46 will similarly be transmitted through the probe member in the opposite direction toward the center thereof. This dissipated heat and cold will thus be neutralized within the probe member 12, and the latter will remain continuously effective as both a heat sink and cold sink.

As shown in FIG. 4, the circuit portion energizing the module of housing 46 includes a variable resistance or rheostat 98 by means of which the heat supplied to tip 20 may be selectively controlled. A similar rheostat may be included for the module in housing 44, if desired, but it is usually preferred to supply maximum cold at the tip 18, particularly where the unit is used as a dental probe, whereas maximum heat generated at the hot tip 20 may be injurious to the patient. The power supply is also provided with an on-off switch 100 which operates in the usual manner to energize and deenergize the probe as desired.

In use of the probe for dental treatment, for example, the dentist may apply hot and cold applications in rapid alternation to the affected teeth with a single instrument. Each probe tip is so constructed as to apply spot heating or cooling to a single tooth. Because of the angular shape of the tips 18 and 20 as well as the angular mounting of the housings 44 and 46, the tips in their fully inserted positions of FIG. 1 extend in opposite directions, that is to say, the probe sections are both normal to the axis of probe member 12 and extend in opposite directions. When one of the tips is in use, the other tip is remote from the area being treated, and is clear of the operator's hand, arm and body. The relative positions of the tips may be selectively varied, however, by merely turning them within the socket bores 70.

While a preferred embodiment of the invention has been shown and described herein, it is obvious that numerous omissions, changes and additions may be made in such embodiment without departing from the spirit and scope of the invention. For example, the probe may be made with only a single housing and tip at one end, and the tip may be made to provide either heat or cold by selectively varying the polarity of the current fed thereto.

What I claim is:

1. A thermoelectric probe for heat-transfer application to selected areas of a human body, said probe comprising an elongated probe member of heat-conductive material, a thermocouple housing mounted at each end of said probe member and a thermocouple module mounted within each of said housings, each thermocouple module comprising a group of semiconductor elements connected at their ends by opposed groups of electrically-conductive plates to form an electrical series of said semiconductor elements with the groups of plates constituting respectively hot and cold junctions of said thermocouple module when electrical current is fed to said series, a pair of leads connected to the ends of each semiconductor element series, and means for electrically connecting said leads to a current source, the cold junction plates of one module and the hot junction plates of the other module being located in intimate heat-exchange association with said probe member, a heat-conductive socket located within each thermocouple housing in heat-exchange association with the plates thereof opposite to said probe member, and a probe tip of heat-conductive material removably mounted within each socket and extending outwardly of the respective thermocouple housing, said probe member being sufficiently heat conductive to transmit the generated cold from the cold junction plates of said one module toward the center of said probe member, and to transmit the generated heat from the hot junction plates of said other module in the opposite direction toward the center of said probe member, whereby said generated heat and cold neutralize each other within said probe member.

2. A thermoelectric probe for heat-transfer application to selected areas of a human body, said probe comprising an elongated probe member of heat-conductive material having oppositely-inclined end surfaces, a pair of thermocouple housings mounted at the respective opposite ends of said probe member, and a thermocouple module mounted within each housing, each thermocouple module comprising a group of semiconductor elements connected at their ends by opposed groups of electrically-conductive plates to form an electrical series of said semiconductor elements with the groups of plates constituting respectively hot and cold junctions of said thermocouple module when electrical current is fed to said series, a pair of leads connected to the ends of said semiconductor element series, and means for electrically connecting said leads to a current source, the cold junction plates of one module and the hot junction plates of the other module being located in intimate heat-exchange association with the respective inclined end surfaces of the probe member and being parallel thereto, a heat-conductive socket located within each thermocouple housing in heat-exchange association with the other group of plates of each module, and a probe tip of heat-conductive material removably mounted within said socket and extending outwardly of said thermocouple housing, said probe member being sufficiently heat conductive to transmit the generated cold from the cold junction plates of said one module toward the center of said probe member, and to transmit the generated heat from the hot junction plates of said other module in the opposite direction toward the center of said probe member, whereby said generated heat and cold neutralize each other within said probe member.

3. A thermoelectric probe according to claim 2 in which said conductive probe member serves as a cold sink for said one module and a heat sink for said other module.

4. A thermoelectric probe according to claim 2 in which each of said tips includes a mounting section and an integral probe section arranged angularly to said mounting section, each mounting section being insertable within a respective socket, with the probe sections of the tips in mounted position extending perpendicularly to the axis of said probe member and in opposite direction to each other.

5. A thermoelectric probe for heat-transfer application to selected areas of a human body, said probe comprising an elongated probe member of heat-conductive material, first Peltier effect thermoelectric means mounted at one end of said probe member, and second Peltier effect thermoelectric means mounted at the opposite end of said probe member, each said thermoelectric means having a hot junction and a cold junction, the hot junction of said first thermoelectric means being arranged in heat conductive association with said one end of said probe member and the cold junction of said first thermoelectric means facing outwardly away from said probe member, the cold junction of said second thermoelectric means being arranged in intimate heat conductive association with said opposite end of said probe member and the hot junction thereof facing outwardly away from said probe member, an energization source for both said thermoelectric means, a heat conductive socket mounted on said probe in heat-exchange relationship with one of said outwardly-facing junctions, and a probe tip of heat conductive material removably mounted within said socket and extending outwardly away from said probe member, said elongated probe member being sized to serve as the handle for said probe and being sufficiently heat-conductive to transmit the cold generated by the cold junction of said second thermoelectric means and the heat generated by the hot junction of said first thermoelectric means toward the center of said probe member for neutralization of said generated heat and cold, whereby said probe member serves as a cold sink for the second thermoelectric means and a heat sink for the first thermoelectric means.

References Cited by the Examiner
UNITED STATES PATENTS

| | | | |
|---|---|---|---|
| 1,622,887 | 3/1927 | Smith | 128—2 |
| 1,715,316 | 5/1929 | Thwing. | |
| 1,752,117 | 3/1930 | Smith | 128—2 X |
| 2,888,918 | 6/1959 | Pierce et al. | 128—2 |
| 2,938,356 | 5/1960 | McMahon | 128—399 X |
| 3,133,539 | 5/1964 | Eidus | 128—399 |

RICHARD A. GAUDET, *Primary Examiner.*

SIMON BRODER, *Examiner.*